United States Patent
Harrington et al.

(10) Patent No.: US 10,625,162 B2
(45) Date of Patent: *Apr. 21, 2020

(54) UNLOCKING GAME CONTENT BASED ON AMOUNTS OF COLLABORATIVE GAMEPLAY

(71) Applicant: Kabam, Inc., San Francisco, CA (US)

(72) Inventors: Clifford J. Harrington, San Francisco, CA (US); Kent Wakeford, Hillsborough, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/299,539

(22) Filed: Mar. 12, 2019

(65) Prior Publication Data
US 2019/0209924 A1    Jul. 11, 2019

Related U.S. Application Data

(63) Continuation of application No. 15/612,878, filed on Jun. 2, 2017, now Pat. No. 10,232,269, which is a continuation of application No. 13/888,033, filed on May 6, 2013, now Pat. No. 9,669,295.

(51) Int. Cl.
| | |
|---|---|
| A63F 13/00 | (2014.01) |
| A63F 13/65 | (2014.01) |
| A63F 13/30 | (2014.01) |
| A63F 13/35 | (2014.01) |
| A63F 13/69 | (2014.01) |
| A63F 13/795 | (2014.01) |
| A63F 13/847 | (2014.01) |

(52) U.S. Cl.
CPC .............. *A63F 13/65* (2014.09); *A63F 13/12* (2013.01); *A63F 13/35* (2014.09); *A63F 13/69* (2014.09); *A63F 13/795* (2014.09); *A63F 13/847* (2014.09)

(58) Field of Classification Search
CPC ........ A63F 13/12; A63F 13/79; A63F 13/795; A63F 13/55; A63F 2300/609
See application file for complete search history.

(56) References Cited

U.S. PATENT DOCUMENTS

| | | |
|---|---|---|
| 2004/0235567 A1 | 11/2004 | Chatani |
| 2006/0178968 A1 | 8/2006 | Jung |
| 2010/0131864 A1 | 5/2010 | Bokor |
| 2010/0216553 A1* | 8/2010 | Chudley ................ A63F 13/55 463/42 |
| 2012/0094757 A1 | 4/2012 | Vago |
| 2012/0142429 A1 | 6/2012 | Muller |

(Continued)

*Primary Examiner* — David L Lewis
*Assistant Examiner* — Eric M Thomas
(74) *Attorney, Agent, or Firm* — Esplin & Associates, PC

(57) ABSTRACT

This disclosure relates to unlocking game content for users of an online game based on amounts of collaborative gameplay. Groups of users interacting with the online game cooperatively are identified and amounts of cooperative gameplay engaged in by the individual groups are quantified. Content in the online game is made available to the groups of users based on the quantified amounts of cooperative gameplay. In implementations, the quantification of the amount of cooperative gameplay engaged in by the groups is made independent from achievement and/or successful accomplishment of any game objective in the online game by the groups.

20 Claims, 2 Drawing Sheets

(56) References Cited

U.S. PATENT DOCUMENTS

2012/0220373 A1* 8/2012 Cantor .................... A63F 13/12
463/40
2012/0252579 A1* 10/2012 Sethi ...................... G06Q 30/02
463/40

* cited by examiner

UNLOCKING GAME CONTENT BASED ON AMOUNTS OF COLLABORATIVE GAMEPLAY

FIELD OF THE DISCLOSURE

This disclosure relates to a system for unlocking gameplay content for players of an online game together based on the amount of usage of the cooperative play between the users.

BACKGROUND

It is known that within online games, users tend to participate in various aspects of the game and engage in cooperative play. Typically, small groups of users perform set tasks or objectives, such as "dungeon runs", or player group vs. player group contests (e.g., battles, sports games, etc.). In some of these, a large number of users may battle on opposite sides and be adversaries. In such play, successful groups can unlock content through achievement (e.g., defeating a boss, etc.).

Players playing an online game together tend to be more engaged with the game, and to spend more money on power-ups, etc., to keep up a higher pace of play. However, no mechanisms exist to reward players purely for playing together, as opposed to achieving together. Players who enjoy playing together may nevertheless choose not to play together any more if they are not successful in their activities and therefore not rewarded by unlocked content.

SUMMARY OF THE DISCLOSURE

One aspect of the disclosure relates to a system for unlocking game content for users of an online game based on the amount of cooperative gameplay between the users. The content unlocked may be based only on quantified amounts of cooperative gameplay engaged in by groups of users and not on the accomplishment of any game objective.

In implementations, a system may include one or more processors configured to execute computer program modules. The computer program modules may include one or more of a game module, a cooperative usage module, a content module, and/or other modules.

The game module may be configured to execute an instance of the online game to facilitate presentation of the online game to the users. The game module may be configured to implement in-game actions in the instance of the online game in response to action requests for the in-game actions from the users.

The cooperative usage module may be configured to identify groups of users interacting with the online game cooperatively and to quantify amounts of cooperative gameplay engaged in by the individual groups. In implementations, an amount of cooperative gameplay engaged in by users in an identified first group is quantified.

The content module may be configured to make content in the online game available to the groups of users based on the quantified amounts of cooperative gameplay. In implementations, a first set of content is made available to the users in the first group based on the quantified amount of cooperative gameplay by the first group of users.

In implementations, the quantification of the amount of cooperative gameplay engaged in by users in the first group is made independent from achievement and/or successful accomplishment of any game objective in the online game by the users in the first group.

In implementations, the amounts of cooperative gameplay are quantified based on amounts of cooperative activity by the groups of users towards one or more particular objectives.

In implementations, the amounts of cooperative gameplay are quantified based on amounts of cooperative activity by the groups of users in the on-line game as a whole.

In implementations, the amounts of cooperative gameplay are cumulative over a period of time.

In implementations, the period of time is the entire in-game life of the users or a sliding window of a certain number of days.

In implementations, the amounts of cooperative gameplay are quantified in time spent by the users in cooperative activities.

In implementations, the amounts of cooperative gameplay are quantified in at least one of number of sessions in which the users participated in cooperative activities, number of cooperative attempts at an objective, and number of times participating in a given cooperative activity.

In implementations, the content comprises at least one of new quests, new map regions, new weapons, new technology, new skills, new troupes, new mounts, and new power-ups available for purchase.

In implementations, the content is made available to the groups of users for cooperative gameplay and not for solo gameplay by the individual users of the groups.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
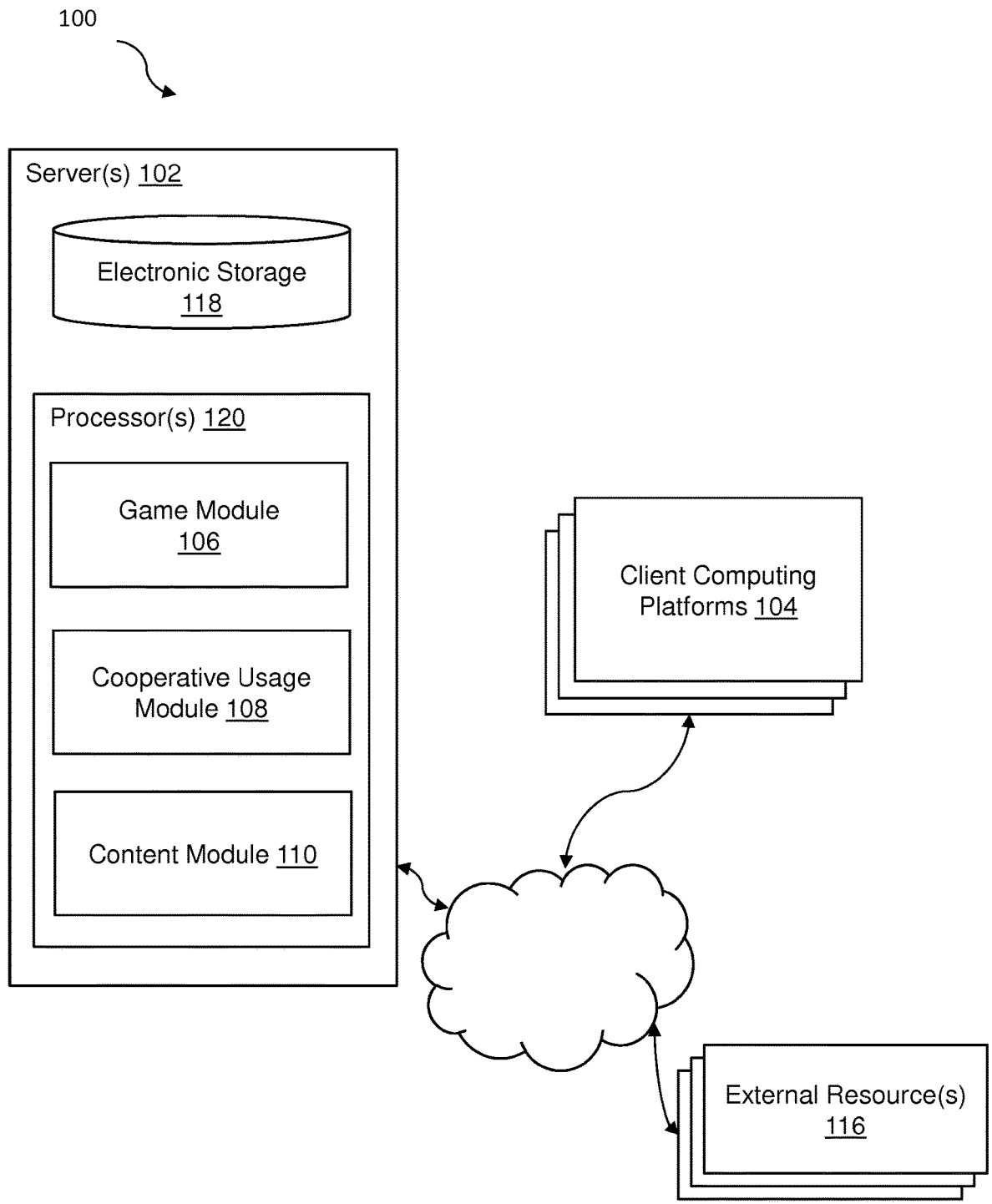
FIG. 1 illustrates a system for unlocking game content for users of an online game based on amounts of cooperative gameplay, in accordance with one or more implementations.

FIG. 1 illustrates a system 100 configured to unlock game content for users of an online game based on amounts of cooperative gameplay. In some implementations, system 100 may include one or more servers 102. The server(s) 102 may be configured to communicate with one or more client computing platforms 104 according to a client/server architecture. The users may access system 100 and/or the virtual space via client computing platforms 104, for instance, to engage in one or more online games.

System 100 is only one example of a suitable computing environment and is not intended to suggest any limitation as to the scope of use or functionality of the features described herein. Providing the virtual space may include hosting the virtual space over a network. In this disclosure, a user of an online game may engage in cooperative gameplay as a member of a group of users. Content associated with the online game may be made available to the user based on a quantified amount of cooperative gameplay by the group of users. The content may be made available independent from achievement and/or successful accomplishment of any game objective in the online game by the users in the group.

In some implementations, system 100 may include one or more servers 102. The server 102 may be configured to communicate with one or more client computing platforms 104 according to a client/server architecture. The users may access system 100 and/or the virtual space via client computing platforms 104, for instance, to engage in one or more games.

The server(s) 102 may be configured to execute one or more computer program modules. The computer program modules may include one or more of a game module 106, a cooperative usage module 108, a content module 110, and/or other modules. As noted, the client computing platform(s) 104 may include one or more computer program modules that are the same as or similar to the computer program modules of the server(s) 102 to facilitate in-game actions.

The game module 106 may be configured to execute an instance of a game to facilitate presentation of the game to users. The game module 106 may be configured to implement in-game actions in the instance of the game, in response to action requests for the in-game actions by the users.

The game may be provided via a virtual space, and may include a plurality of resource types and/or maps. An instance of the virtual space may be executed by computer modules to determine views of the virtual space. The views may then be communicated (e.g., via streaming, via object/position data, and/or other information) from server(s) 102 and/or sources to client computing platforms 104 for presentation to users. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated.

User-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102.

The cooperative usage module 108 may be configured to identify groups of users interacting with the online game cooperatively and to quantify amounts of cooperative gameplay engaged in by the individual groups. In implementations, the cooperative usage module is configured such that the quantification of the amount of cooperative gameplay engaged in by the individual groups is made independent from achievements and/or accomplishments of any game objective in the online game by the users in the groups.

In implementations, the amounts of cooperative gameplay may be quantified based on amounts of cooperative activity by the groups of users towards one or more particular objectives and/or based on amounts of cooperative activity by the individual groups of users in the on-line game as a whole. The amounts of cooperative gameplay may be cumulative over a period of time, such as the entire in-game life of the users or a sliding window of a certain number of days. The amounts of cooperative gameplay may be quantified in time spent by the users in cooperative activities, number of sessions in which the users participated in cooperative activities, number of cooperative attempts at an objective, and/or number of times participating in a given cooperative activity. The amount of cooperative gameplay determined for a first group (e.g., including a first player and a second player) may include or exclude, depending on the implementation, periods of time and/or activities within the game when the players of the first group are engaged in cooperative gameplay together, and with a player that is not a member of the first group (e.g., a third player). The amount of cooperative gameplay determined for the first group may exclude periods of time and/or activities within the game when less than all of the players of the first group are engaged in cooperative gameplay together (e.g., when the first player is missing). The amount of cooperative gameplay determined for the first group may include periods of time and/or activities within the game when less than all of the players of the first group are engaged in cooperative gameplay together so long as some threshold level of participation is achieved. The threshold level of participation may include a percentage of the first group as a whole that are engaged in the cooperative gameplay, a minimum number of players from the first group that are engaged in the cooperative gameplay, and/or other levels.

The content module 110 may be configured to make content in the online game available to the groups of users based on the quantified amounts of cooperative gameplay. In implementations, the content includes new quests, new map regions, new weapons, new technology, new skills, new troupes, new mounts, new power-ups available for purchase, and/or other new content. In implementations, the content may be made available to the groups of users for cooperative gameplay and not for solo gameplay by the individual users of the groups.

Since the cooperative usage module 108 may quantify the amount of cooperative gameplay by a group of users without regard for achievement during such cooperative gameplay, the content module 110 may make content available in the online game to the group even if the group of users does not excel or achieve in the cooperative gameplay. This may distinguish the release of content by the content module 110 from convention games in which users can play cooperatively in a game (e.g., as members of a raid through a dungeon instance) to have content unlocked (e.g., an item drop, a level unlock, and/or other content unlocks) based on successfully completing one or more game objectives (e.g., defeating a boss character, performing in a race, and/or other game objectives). Instead, the content released by the content module 110 may reward users for cooperative gameplay in and of itself.

In some implementations, server(s) 102, client computing platforms 104, and/or external resources 116 may be operatively linked via one or more electronic communication links. For example, such electronic communication links may be established, at least in part, via a network such as the Internet and/or other networks. The network may be a wired or wireless network such as the Internet, an intranet, a LAN, a WAN, a cellular network or another type of network. It will be understood that the network may be a combination of multiple different kinds of wired or wireless networks. It will be appreciated that this is not intended to be limiting, and that the scope of this disclosure includes implementations in which server(s) 102, client computing platforms 104, and/or external resources 116 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 116 may include sources of information, hosts and/or providers of virtual environments outside of system 100, external entities participating with system 100, and/or other resources. In some implementations, some or all of the functionality attributed herein to external resources 116 may be provided by resources included in system 100.

Server 102 may include electronic storage 118, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 118 may comprise non-transitory storage media that electronically stores information. The electronic storage media of electronic storage 118 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108 and 110. Processor 120 may be configured to execute modules 106, 108 and 110 by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108 and 110 are illustrated in FIG. 1 as being implemented within a single processing unit, in implementations in which processor 120 includes multiple processing units, one or more of modules 106, 108, and 110 may be implemented remotely from the other modules. The description of the functionality provided by the different modules 106, 108 and 110 described below is for illustrative purposes, and is not intended to be limiting, as any of modules 106, 108 and 110 may provide more or less functionality than is described. For example, one or more of modules 106, 108 and 110 may be eliminated, and some or all of its functionality may be provided by other ones of modules 106, 108 and 110. As another example, processor 120 may be configured to execute one or more additional modules that may perform some or all of the functionality attributed below to one of modules 106, 108 and 110.

Figure 2:
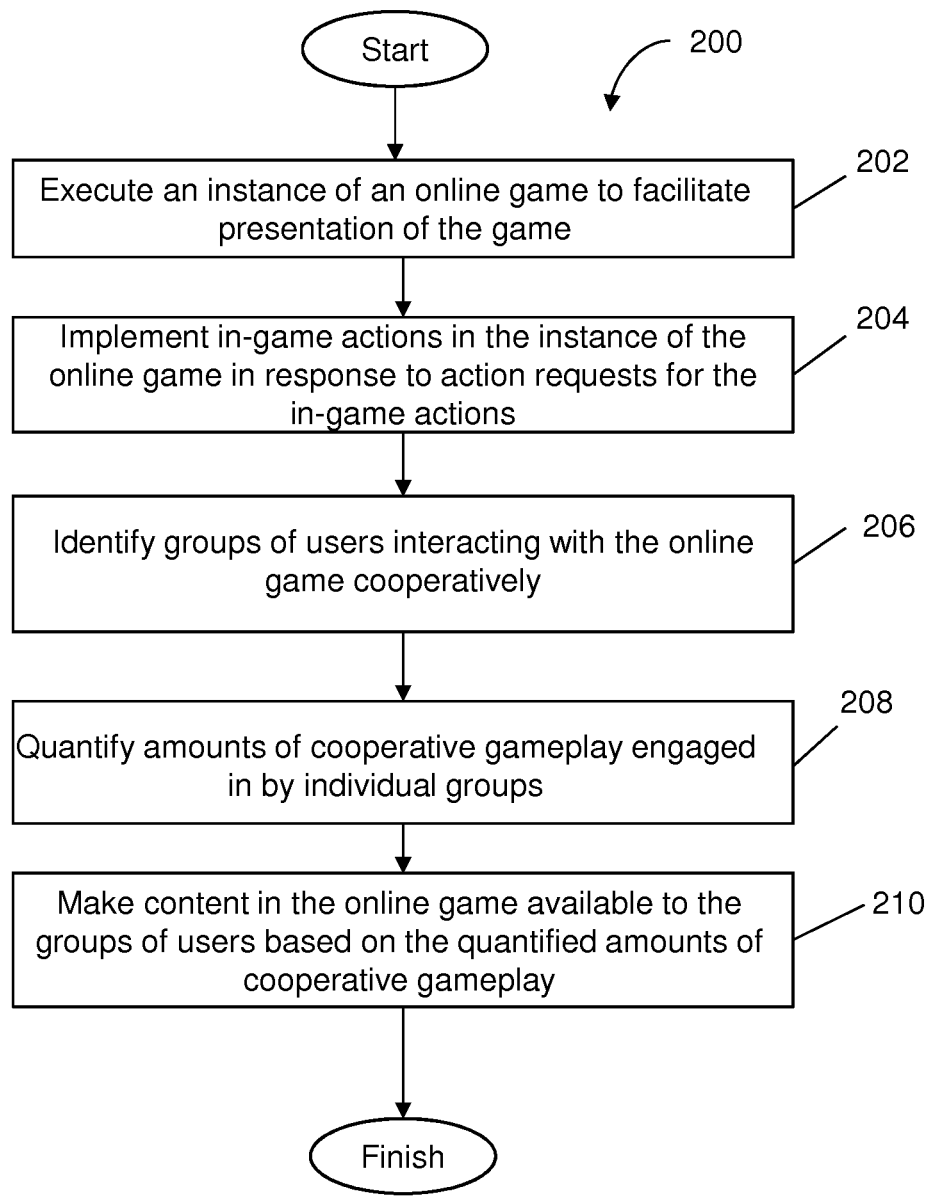
FIG. 2 illustrates a method for unlocking game content for users of an online game based on amounts of cooperative gameplay, in accordance with one or more implementations.

FIG. 2 illustrates a method 200 for unlocking gameplay content based on amounts of cooperative gameplay. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of an online game may be executed to facilitate presentation of the game to users. The game, for instance, may include parameters including a size and/or type of virtual space the game will be played on, the number of players, resource types, user-controlled elements, and/or buildings initially allocated to users. Operation 202 may be performed by a game module that is the same as or similar to game module 106, in accordance with one or more implementations.

At an operation 204, in-game actions may be implemented in the instance of the game in response to action requests for in-game actions by the users. Operation 204 may be performed by a game module that is the same or similar to game module 106, in accordance with one or more implementations.

At an operation 206, groups of users interacting with the online game cooperatively are identified, including a first group of users. In implementations, this identification may be performed in a variety of different manners. For example, users may explicitly choose to form a group, or groups may be identified based on proximity and for example length of time within a certain radius or pursuing shared objectives, and/or based on in-game interactions such as trading or chatting/communicating. Operation 206 may be performed by a cooperative usage module that is the same or similar to cooperative usage module 108, in accordance with one or more implementations.

At operation 208 amounts of cooperative gameplay engaged in by the individual groups are quantified such that for the identified first group, an amount of cooperative gameplay engaged in by the users in the first group is quantified. In implementations, the quantification of the amount of cooperative game engaged in by users in the first group at operation 208 is made independent from achievement and/or successful accomplishment of any game objective in the online game by the users in the first group. So, for example, the quantification may be based on how many cooperative attempts were made at a certain objective or type of objective, or how much time was spent cooperatively trying to achieve an objective, but not whether the objective was actually achieved.

In implementations, the amounts of cooperative usage may be determined based on the amounts of cooperative activity by the groups of users towards one or more objectives or in the online game as a whole, and may be cumulative over a period of time (e.g., entire in-game life of the users and/or a sliding window of a certain number of days). The cooperative usage at operation 208 may be quantified in a number of sessions in which the users have participated in cooperative activities, a number of cooperative attempts at an objective, and/or a number of times participating in a given cooperative activity.

For example, cooperative usage may be quantified by an amount of time during which a group of users, or a certain minimum percentage of the group of users, were active and within a certain proximity of one another (e.g. the same game screen, or an in-game distance such as a "mile" within the virtual space). That amount of time may be over the entire history of the group, or over for example the last month or last three months. The amount of cooperative usage by a group may also be quantified as the number of discrete sessions in which the users of the group (or a minimum percentage thereof) participated in cooperative activities. A given session may be considered to end when, for example, the number of users in the group in proximity to one another drops below a minimum percentage, or level of activity drops too low (e.g. users are "standing around" and not actively fighting, trading, etc.). The amount of cooperative usage by a group may also be quantified as the number of attempts made by the group to cooperatively achieve an objective, such as a given quest or group of quests. Amounts of cooperative usage may also be quantified as a combination of one or more of the above examples, for example amount of time spent cooperatively over the entire history of the group plus ten times (or some other multiple) the time spent cooperatively over the last month. Operation 208 may be performed by a cooperative usage module that is the same or similar to cooperative usage module 108, in accordance with one or more implementations.

At operation 210, content in the online game is made available to the groups of users based on the quantified amounts of cooperative gameplay. The content includes a set of content made available to the users in the first group based on the quantified amount of cooperative gameplay performed by the first group of users. In implementations, the content unlocked during cooperative gameplay may consist of new quests, new map regions, new weapons, new technology, new skills, new troupes, new mounts and new power-ups. The content unlocked during the cooperative gameplay may be made available to the groups of users for cooperative gameplay and not for solo gameplay by the individual users of the groups. For example, if two users play together constantly, as the amount of their cooperative gameplay exceeds threshold amounts new types of quests may be unlocked for the two of them playing together, and this content may be unavailable to each of the two users when playing without the other.

The type of content unlocked may vary depending on the quantification of amount of cooperative gameplay. For example, amount of cooperative gameplay may be quantified based both on total time spent in cooperative activities overall and total time spent in particular cooperative activities such as attempting to complete a certain quest, engaging in a certain activity such as resource harvesting, and/or within a certain game region. As total time spent in cooperative activities overall crosses thresholds, new regions may be made available to the group, as total time spent in a certain region crosses thresholds, new quests in that region may be made available to the group, as total time spent harvesting crosses thresholds, new harvesting skills and power-ups may be made available to the group, etc. Operation 210 may be performed by a content module that is the same or similar to content module 110, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A gaming system for unlocking game content for users of an online game based on cooperative gameplay among multiple users, the gaming system comprising:
    a memory; and
    game server, the game server comprising:
        one or more processors configured by machine-readable instructions to:
            execute an instance of the online game and to use the instance to generate game state information that is transmitted to client computing platforms, the game state information facilitating presentation of the online game to the users via the client computing platforms, wherein the client computing platforms are associated with the users;
            identify groups of users interacting with the online game cooperatively to progress toward one or more game objectives, and to determine amounts of cooperative gameplay engaged in by individual ones of the identified groups in the online game such that, for a first identified group of users engaged in cooperative gameplay toward one or more first game objectives, a first amount of cooperative gameplay engaged in by the first identified group of users is determined, wherein the first amount of cooperative gameplay is based on a first amount of time spent by the first identified group of users during the cooperative gameplay in the online game; and
            make content in the online game available to the identified groups of users based on the determined amounts of cooperative gameplay without regard to whether the identified groups of users are successful in achieving any particular game objectives, the content including a first set of content made available to the first identified group of users based on the first amount of cooperative gameplay engaged in by the first identified group of users.

2. The gaming system of claim 1, wherein the one or more processors are configured by machine-readable instructions such that determination of the first amount of cooperative gameplay is made independent from achievement and/or successful accomplishment of any particular game objectives in the online game by users in the first identified group of users.

3. The gaming system of claim 1, wherein the amounts of cooperative gameplay are determined based on amounts of cooperative activity by the identified groups of users towards one or more particular game objectives.

4. The gaming system of claim 1, wherein the amounts of cooperative gameplay are determined based on amounts of cooperative activity by the identified groups of users in the online game as a whole.

5. The gaming system of claim 1, wherein the amounts of cooperative gameplay are cumulative over a period of time.

6. The gaming system of claim 5, wherein the period of time is the entire in-game life of the users or a sliding window of time.

7. The gaming system of claim 1, wherein the amounts of cooperative gameplay are determined based on time spent by the users in cooperative activities.

8. The gaming system of claim 1, wherein the amounts of cooperative gameplay are determined further based on at least one of number of sessions in which the users participated in cooperative activities, number of cooperative attempts at achieving a particular game objective, and number of times participating in a given cooperative activity.

9. The gaming system of claim 1, wherein the content comprises at least one of new quests, new map regions, new weapons, new technology, new skills, new troupes, new mounts, and new power-ups available for purchase.

10. The gaming system of claim 1, wherein the content is made available to the identified groups of users for cooperative gameplay and not for solo gameplay by the individual users of the identified groups.

11. A computer-implemented method for content being made available to users of an online game based on cooperative gameplay among multiple users, the method being implemented in a gaming system that includes a game server, the game server including one or more processors, the method comprising:
    executing an instance of the online game and using the instance to generate game state information that is transmitted to client computing platforms, the game state information facilitating presentation of the online game to the users via the client computing platforms, wherein the client computing platforms are associated with the users;
    identifying groups of users interacting with the online game cooperatively to progress toward one or more game objectives, and determining amounts of cooperative gameplay engaged in by individual ones of the identified groups in the online game such that, for a first identified group of users engaged in cooperative gameplay toward one or more first game objectives, a first amount of cooperative gameplay engaged in by the first identified group of users is determined, wherein the first amount of cooperative gameplay is based on a first amount of time spent by the first identified group of users during the cooperative gameplay in the online game; and making content in the online game available to the identified groups of users based on the determined amounts of cooperative gameplay without regard to whether the identified groups of users are successful in achieving any particular game objectives, the content including a first set of content made available to the first identified group of users based on the determined amount of cooperative gameplay engaged in by the first identified group of users.

12. The method of claim 11, wherein determination of the first amount of cooperative gameplay is made independent from achievement and/or successful accomplishment of any particular game objectives in the online game by users in the first identified group of users.

13. The method of claim 11, wherein the amounts of cooperative gameplay are determined based on amounts of cooperative activity by the identified groups of users towards one or more particular game objectives.

14. The method of claim 11, wherein the amounts of cooperative gameplay are determined based on amounts of cooperative activity by the identified groups of users in the on-line game as a whole.

15. The method of claim 11, wherein the amounts of cooperative gameplay are cumulative over a period of time.

16. The method of claim 15, wherein the period of time is the entire in-game life of the users or a sliding window of time.

17. The method of claim 11, wherein the amounts of cooperative gameplay are determined based on time spent by the users in cooperative activities.

18. The method of claim 11, wherein the amounts of cooperative gameplay are determined further based on at least one of number of sessions in which the users participated in cooperative activities, number of cooperative attempts at achieving a particular game objective, and number of times participating in a given cooperative activity.

19. The method of claim 11, wherein the content comprises at least one of new quests, new map regions, new weapons, new technology, new skills, new troupes, new mounts, and new power-ups available for purchase.

20. The method of claim 11, wherein the content is made available to the identified groups of users for cooperative gameplay and not for solo gameplay by the individual users of the identified groups.

* * * * *